A. & C. GEISSEL.
INCLOSURE FOR THE BODIES OF MOTOR CARS.
APPLICATION FILED APR. 5, 1913.
1,082,316.
Patented Dec. 23, 1913.
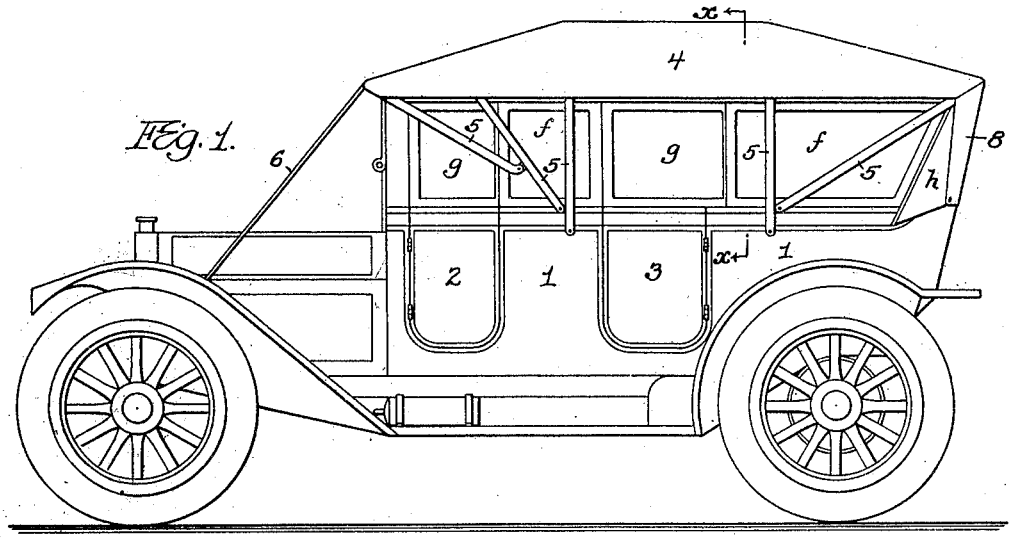
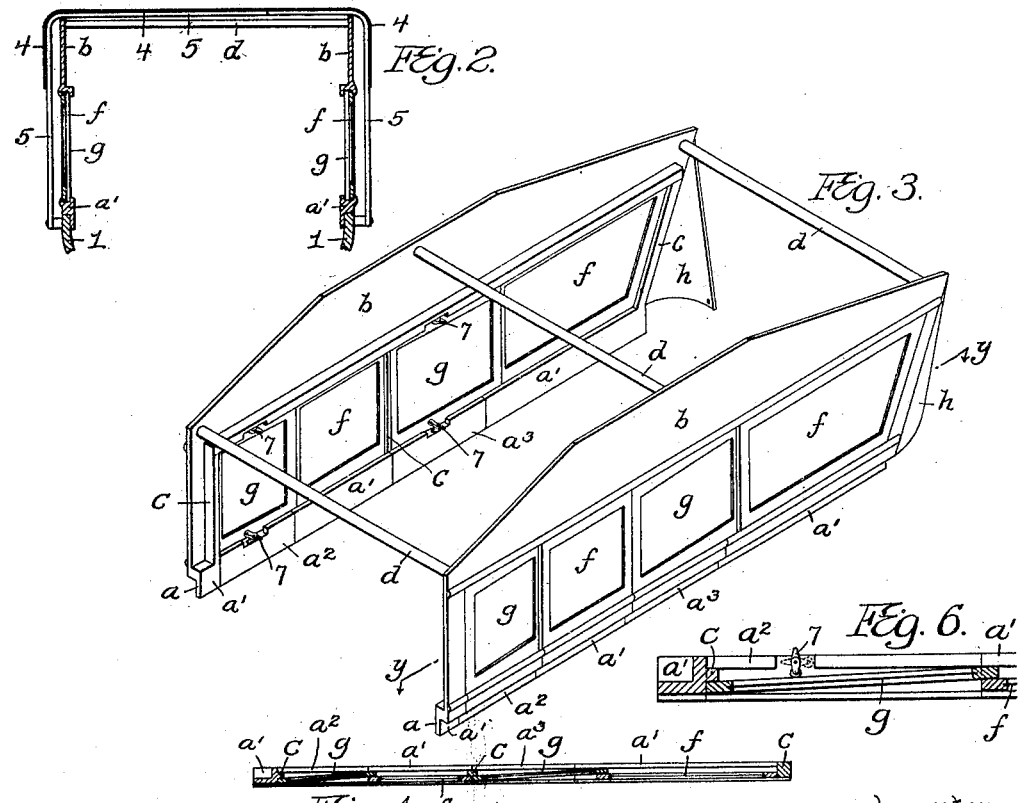

UNITED STATES PATENT OFFICE.

AUGUST GEISSEL AND CONRAD GEISSEL, OF PHILADELPHIA, PENNSYLVANIA.

INCLOSURE FOR THE BODIES OF MOTOR-CARS.

1,082,316.

Specification of Letters Patent.

Patented Dec. 23, 1913.

Application filed April 5, 1913. Serial No. 759,140.

*To all whom it may concern:*

Be it known that we, AUGUST GEISSEL and CONRAD GEISSEL, both citizens of the United States, residing in Philadelphia, Pennsylvania, have invented certain Improvements in Inclosures for the Bodies of Motor-Cars, of which the following is a specification.

The object of our invention is to provide an inclosure readily applicable to a motor car having an uninclosed body, and serving to convert the same into a car of the limousine or closed body type for use in cold or inclement weather, the inclosing attachment being as readily removable when its further use is not desired.

This object we attain by interposing between the open body and top of the car a structure having glazed sashes which, in connection with said body and top, will render the car weather-proof and therefor constitute it, for the time being, an acceptable substitute for a car having a permanently closed limousine body.

In the accompanying drawing—Figure 1 is a side view of an ordinary automobile of the touring car type having our improved body-inclosing attachment applied thereto; Fig. 2 is a transverse section on the line $x$—$x$, Fig. 1; Fig. 3 is a perspective view of our improved attachment as it appears when detached from the car; Fig. 4 is a longitudinal section on the line $y$—$y$, Fig. 3; Fig. 5 is a similar section, but showing certain movable sashes of the attachment adjusted so as to permit ingress to or egress from the car through either of the doorways thereof, and Fig. 6 is a sectional view illustrating, on a larger scale, one of the features of our invention.

In Fig. 1 of the drawing, 1 represents the open body of an ordinary automobile of the touring car type, 2 one of the fore doors and 3 one of the rear doors of the same, and 4 the usual top which is held in place by the ordinary hinged brace yokes 5 and front stays 6. In order to convert such a car into one having a closed or limousine body, we interpose between the body 1 and top 4 a relatively rigid structure such as shown in Fig. 3, this structure comprising opposite bottom bars $a$, opposite top bars $b$, upright connecting posts $c$, transverse braces $d$ and glazed sashes $f$ and $g$ interposed between said upper and lower side bars $b$ and $a$ which are preferably grooved for their reception, as shown in Fig. 2. Each of the lower side bars $a$ is composed of sections indicated respectively at $a'$, $a^2$ and $a^3$, the sections $a'$ being secured to the top of the body portion 1 of the car, the section $a^2$ to the top of the hinged fore door 2 and the section $a^3$ to the top of the hinged rear door 3, as shown in Fig. 1.

The sashes $f$—$f$ may be permanently secured in position between the upper and lower bars $b$ and $a$ of the structure but the sashes $g$ are slidingly mounted so that they can be moved longitudinally behind the sashes $f$ when it is desired to open the hinged doors 2 or 3 in order to permit ingress to or egress from the vehicle, the sashes being again restored to their normal position after the doors have been closed. When the sliding sashes are in closed position the front rail of the forward sash $g$ is held snugly between the forward post $c$ and the outer flanges of the grooved upper and lower bars $b$ and $a$ and the rear rail of said sash is confined between the inner flanges of said bars and the front rail of the forward sash $f$, as shown in Fig. 4, and in like manner the front rail of the rear sash $g$ is confined between the intermediate post $c$ and the outer flanges of the grooved top and bottom bars $b$ and $a$ while the rear rail of said sash is confined between the inner flanges of said bars and the forward rail of the rear sash $f$.

In order to confine the sliding sashes firmly in their closed position and thus prevent rattling and check drafts, we find it preferable to mount upon the upper and lower bars $b$ and $a$ about midway of the sashes $g$, when the latter are closed, cam levers 7 which when turned to the position shown in Fig. 3 and by full lines in Fig. 6, press firmly against the upper and lower rails of the sashes $g$ and hold the same firmly in position but when turned to the position shown by dotted lines in Fig. 6 release said sashes so that they can be readily moved rearwardly behind the sashes $f$. In order to close the gaps between the rear posts $c$ of the inclosing structure and the rear apron 8 which extends from the cover 4 to the back of the body 1 we provide said inclosing structure with triangular rear aprons $h$ at each side, the front edges of these aprons being secured to the posts $c$ and their rear edges underlapping the edges of the rear apron 8 and being secured thereto in any available manner.

As shown in the drawing the upper surfaces of the top bars b of the body-inclosing structure are shaped to conform to the shape of the top 4 but this is not essential.

We claim:

1. The combination of the open body, swinging doors, flexible top, and pivoted braces of an automobile with an interposed and relatively rigid structure comprising opposite lower bars made in sections secured respectively to the body and doors, and opposite upper bars bearing against said flexible top, said structure being provided with glazed sashes and serving, in connection with said body and top, to inclose the vehicle after the manner of a limousine.

2. The combination of the open body, swinging doors, flexible top, and pivoted braces of an automobile, with an interposed and relatively rigid structure comprising opposite lower bars made in sections secured to the body and doors, and opposite upper bars bearing against said flexible top, said structure being provided with glazed sashes engaging said upper and lower bars, the sashes corresponding with the swinging doors being so mounted as to be movable out of engagement with the bars carried by said doors in order to permit of the opening of the latter.

3. The combination of the open body, swinging doors, flexible top, and pivoted braces of an automobile, said flexible top having a flexible rear apron, and an inclosing structure comprising opposite side members each consisting of upper and lower bars and interposed glazed sashes, and aprons at the rear ends of said side members for closing the spaces between the latter and the rear apron of the cover.

4. The within described inclosing structure for an automobile, the same comprising side members each having upper and lower bars and interposed glazed sashes some of which are slidably mounted, said bars being grooved and provided with connecting posts between which and the flanges of the bars the front bars of the sliding sashes can be confined when said sashes are closed.

In testimony whereof, we have signed our names to this specification in the presence of two subscribing witnesses.

AUGUST GEISSEL.
CONRAD GEISSEL.

Witnesses:
KATE A. BEADLE,
HAMILTON D. TURNER.